Jan. 12, 1937.  W. W. STUART  2,067,426
CONTROL MECHANISM FOR AIR CONDITIONING SYSTEMS
Filed Oct. 21, 1935  2 Sheets-Sheet 1
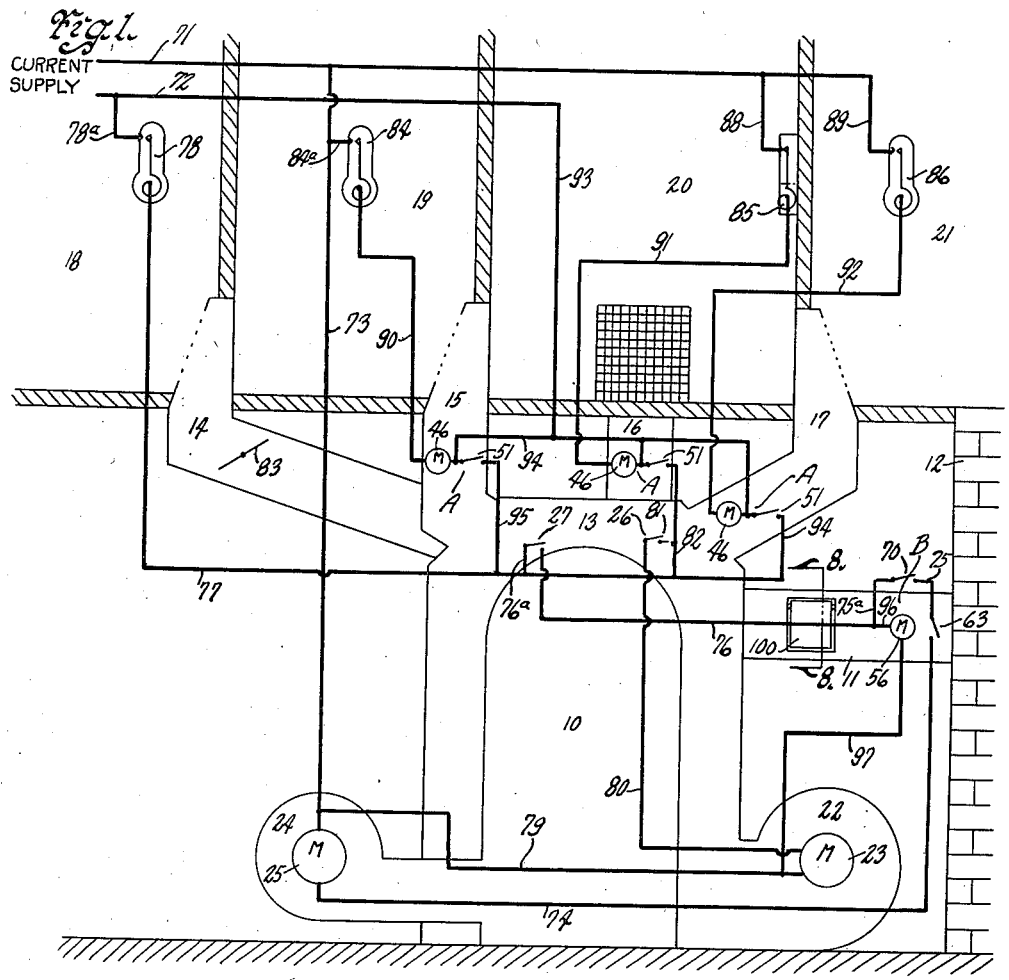
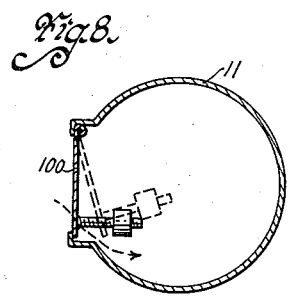
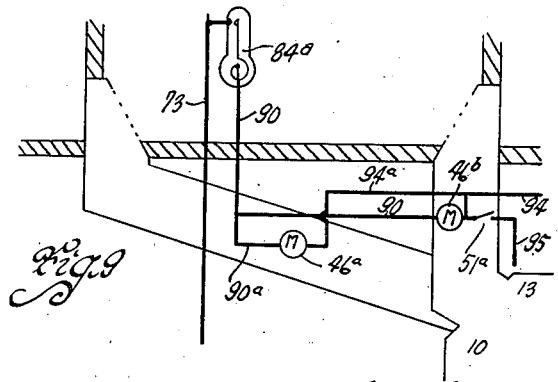

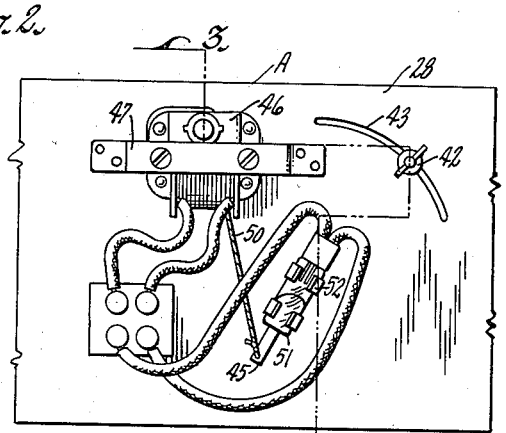
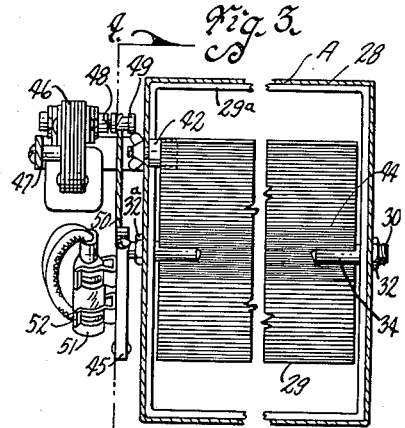
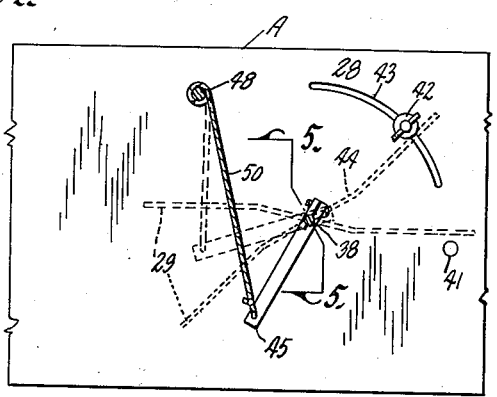
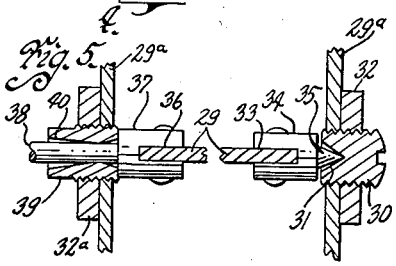
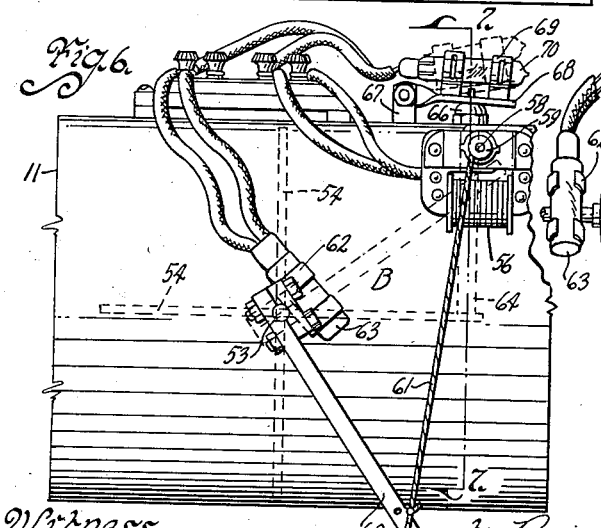
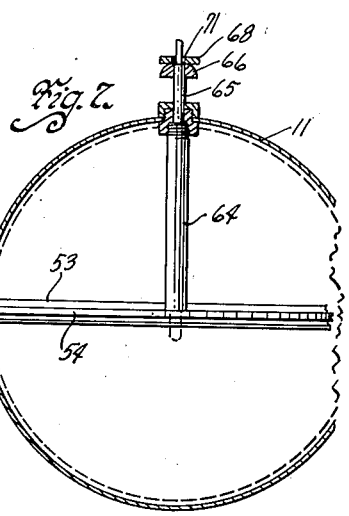

Patented Jan. 12, 1937

2,067,426

UNITED STATES PATENT OFFICE 2,067,426

CONTROL MECHANISM FOR AIR CONDITIONING SYSTEMS

William W. Stuart, Des Moines, Iowa

Application October 21, 1935, Serial No. 46,003

19 Claims. (Cl. 236—11)

My present invention relates to a control mechanism for air conditioning systems.

It is my object to provide a control mechanism so simple, compact and inexpensive as to bring zone control within the range of the householder and others to whom price is an important object.

In carrying out my purpose, it is my object to provide control mechanism in the form of individual duct flow control elements and controls therefor, so that each duct may have a control element, a remotely controlled motor for actuating the elements, and, in cases where desired, a switch actuated in accordance with damper movements and adapted to be connected with air conditioning equipment.

Another object is to provide a system, or combination including a heating unit and a series of individual ducts and dampers for affording control of air flow to different rooms, and a motorized stack damper to conserve the heat remaining in the plant when the burner is shut off, so that such heat can be used during stand-by periods. Where a draft adjuster is used in such a system, it is placed between the stack damper and the heating unit. This arrangement retains heat in the chimney during stand-by periods longer than where the draft adjuster is open, insures a longer period during which the chimney will retain heat for producing draft when the burner starts, and in case of an inside chimney allows radiation of more heat to the building.

Thus one of my objects is to use more of the residual heat left in the plant when the generation of heat is stopped and to maintain through a greater percentage of the stand-by period a close approach to operating conditions in the system.

It follows that residual heat is conserved so that when any part of the building calls for heat, the residual heat is utilized before the burner is again started.

The stack damper may sometimes be omitted.

Still another purpose is to provide in such a system simple means whereby whenever heat is desired in certain rooms, it will be supplied thereto and also to another room, for instance a bath room.

It is another object to provide such a system in which the duct work, blowers, dampers and other parts can be used with cooling means.

My system is particularly intended for air control in a warm air furnace, using any means to heat the air, but it is adapted for use with steam and hot water heating systems or with cooling systems.

More particularly, it is one of the objects of my invention to provide an air duct section having a damper mounted therein by bearings, which prevent binding, which might otherwise occur on account of distortion of the duct during installation or because of use or temperature changes.

Another purpose is to provide such a section carrying a motor, and a switch which in one form of the invention functions as a weight to normally hold the damper in one position.

Still another object is to provide means whereby the energizing of the motor actuates the damper and the switch, such that when the motor is de-energized the parts automatically move to position ready for another cycle of operation.

One of my purposes is to provide such a unit having a motor to operate a damper and a switch operable in conjunction with the damper and mounted to serve as a weight to move the damper in one direction.

One of the specific objects is to provide a form of my invention including a unit section supporting a motor having a rotatable member, the unit having a pivoted damper and a switch operable in conjunction with the damper, and to operatively connect the damper with the rotary member of the motor by means of a flexible element adapted to be wound on the rotary member.

With these and other objects in view, my invention consists in the construction, arrangement and combination of the various parts of my control mechanism, whereby the objects contemplated are attained, as hereinafter more fully set forth, pointed out in my claims, and illustrated in the accompanying drawings, in which:

Figure 1 is a diagrammatic view of a system illustrating my invention.

Figure 2 is a side elevation of one of my individual duct damper devices forming a part of my system.

Figure 3 is a vertical, sectional view taken on the line 3—3 of Figure 2.

Figure 4 is a detail, sectional view taken on the line 4—4 of Figure 3, illustrating parts of my individual duct damper control.

Figure 5 is a sectional view taken on the line 5—5 of Figure 4.

Figure 6 is a side elevation of a section of smoke pipe or stack equipped with my improved stack damper.

Figure 7 is a detail, sectional view taken on the line 7—7 of Figure 6.

Figure 8 is a detail, sectional view taken on the line 8—8 of Figure 1, and illustrating the automatic draft adjuster.

Figure 9 is a diagrammatic view of a system like that of Figure 1, slightly modified, so that one thermostat may control a plurality of dampers.

In the accompanying drawings, the reference numeral 10 indicates a furnace which may be equipped with an oil burner (not shown) for example. A smoke pipe 11 leads from the furnace 10 to the stack 12. The furnace has the usual bonnet 13 from which air conducting ducts 14, 15, 16 and 17 lead to rooms 18, 19, 20 and 21. There is provided a fan 22 and a fan motor 23 for forcing air through the bonnet 13 and through the various air ducts. There is also provided a fan or pump 24 and a motor 25. Suitably located within the bonnet 13 is a fan control switch 26. There is also provided a suitably located limit control switch 27, which, as here shown, is also in the bonnet 13. The purpose of the limit control switch is to shut down the heating system in case of excessive heat in the bonnet.

Individual duct damper

In each of the ducts 15, 16, and 17 is an individual duct damper and with each damper there is associated a control. The damper and control mechanism generally is indicated at A in Figure 1 and is shown in detail in Figures 2 to 5 inclusive.

The damper and control mechanism may be inserted in any duct but I preferably install them in an individual duct section indicated at 28.

I will now describe one of the dampers and its controlling mechanism.

In the duct section 28 is a damper 29 pivotally mounted in a frame 29a fitted in the duct section 28 and so balanced as to normally hang in closed position.

In the structure shown in my drawings, the damper 29 comprises a sheet of metal mounted in the following manner:

Suitably mounted in one side of the frame 29a, as for instance by a screw-threaded connection therewith is a bearing member 30 at the inner end of which is a conical socket 31. On the bearing member 30 outside the frame 29a is a lock nut 32. The frame 29a is fastened in the duct section in any suitable way and the duct section may be provided with a suitable opening to receive the bearing member 30 and the lock nut 32, which opening is otherwise closed by the frame 29a.

One edge of the damper 29 is received and gripped in a slot 33 of a cylindrical member 34, which has a pointed end 35 journaled in the socket 31. The other side of the damper 29 is received in a similar slot 36 in a cylindrical member 37, which has a reduced portion 38 projecting through the opposite side of the frame 29a and through the wall of the duct section 28 opposite the member 30 and rotatable in a journal 39. The journal 39 is mounted in the frame 29a as by a threaded connection therewith, and may have a lock nut 32a similar to the lock nut 32.

Here again the wall of the duct section 28 should be provided with a suitable opening to permit clearance of the journal 39 and lock nut 32a, which opening is otherwise closed by the frame 29a.

The bore 40 of the journal 39 is Venturi-shaped.

It will be seen therefore that the damper is so mounted that it may rock with a minimum of friction.

This design in which the damper is mounted in the frame and the frame is mounted in the duct permits some distortion of the frame without causing the bearings to bind and also permits some distortion of the duct without affecting the frame or the bearings.

A stop 41 is so arranged as to limit the opening movement of the damper. A stop 42 may be adjustably mounted in the wall of the duct section 28 to travel in a slot 43. The stop 42 is adapted to be set to limit the closing movement of the damper, and thus prevent the complete closing of the passage through the duct section.

On lines spaced on opposite sides of its axis and indicated at 44 in Figure 4, the damper 29 is bent slightly away in opposite directions from the plane of its axis. This is simply to provide ribs for strengthening the damper. Other forms of damper structure might be used.

Outside the duct section 28, an arm 45 is adjustably mounted on the shaft-like extension 38 of the member 37 for adjustment around the member 38 to permit of the installation of the arm on the member 38 in any position necessary according to the inclination of the duct in which the damper is installed.

I provide a damper motor 46 of the shaded pole induction type, which may be mounted on the outside of the duct section 28 by means of a bracket 47. On a motor shaft 48 is a small spool 49. A flexible element 50 is connected to the free end of the arm 45 and is also connected with the spool 49 in such manner as to be wound thereon for pulling the free end of the arm 45 toward the motor shaft and thus rocking the damper 29 when the motor is energized.

On the arm 45 is supported a mercury tube switch 51, and these parts are so arranged that in the installation here illustrated, the arm 45 is inclined downwardly and the switch 51 is in open position when the damper 29 is at the limit of its movement toward closed position. When the arm 45 is swung upwardly by the winding of the flexible member 50 on the spool on the shaft of the motor 46, the damper 29 is swung from its duct closing position toward its open position.

As the damper moves toward full open position, the switch contact is closed. The tube switch 51 is mounted in spring clips 52 on the arm 45.

It will be seen that the adjustable mounting of the arm 45 and the mode of mounting the switch on the arm make it possible to so adjust these parts as to cause the switch to open and close in an opposite manner to that described, if such an arrangement is desired.

It is obvious that the parts could be very readily adjusted to enable the motor to pull the damper to closed instead of to opened position.

Stack damper

In the smoke pipe or breeching adjacent the stack or chimney, I mount a motorized stack damper indicated generally in Figure 1 at B and shown in detail in Figures 6 and 7.

Journaled in the wall of the smoke pipe 11 is a shaft 53, which preferably projects from both sides of the smoke pipe, so that an operating arm may be mounted on either end of the shaft depending upon the installation requirements of the particular job, or to permit mounting an operating arm on one end, and a switch on the other, if that should be desirable.

The shaft 53 is slotted to receive a damper 54, which is mounted to normally stand in closed position.

Suitably located as for instance on the pipe 11 is a motor 56 similar to the motor 46, having a shaft 58 on which is a spool 59.

Supported on the shaft 58 is a clip 62, which detachably holds a mercury switch 63. The parts are so arranged that when the motor 56 is energized, the flexible member 61 is wound upon the spool 59 for thus actuating the arm 60 in a direction to open the damper 54, swinging it from its vertical position shown in dotted lines in Figure 6 to its horizontal position shown in dotted lines in that figure.

This same movement of the parts, including the shaft 53, rocks the switch 63 to contact engaging and circuit closing position. The switch is in circuit with the burner motor 25, as will be hereinafter more fully explained.

I provide a safety feature in connection with my damper 54. Mounted in the top of the pipe 11 and extending downwardly therefrom on the interior thereof in the path of the opening movement of the damper 54 is a sleeve 64. Slidably mounted in the wall of the pipe 11 and slidable in the sleeve 64 is a rod 65 on which is a collar or stop member 66. The member 66 limits the downward movement of the rod 65 at such a point that the lower end of the rod normally projects below the lower end of the sleeve 65 in such manner that when the damper 54 is swung to open or horizontal position, as shown for instance in Figure 6, it will strike and lift up the rod 65.

On the pipe 11 is a small bracket 67 (Figure 6) to which is pivoted a bracket arm or the like 68, which carries the spring clips 69. These clips support a mercury switch 70. The arm 68 has a slot 71 through which the upwardly projecting end of the rod 65 extends. The switch 70 is included in circuit with the switch 63 in the manner hereinafter described, so that it breaks the circuit when in its lowered position. If the damper or the rod 65 should stick, so that the damper will not fully open, then the switch 70 will be in open position, and it will not close a circuit through the burner motor.

*Electrical connections*

The general arrangement of the parts heretofore described with relation to each other, has already been described and is illustrated diagrammatically in Figure 1.

In that figure, I have also shown how the parts are electrically connected. At 71 and 72 are indicated the line or current supply wires. From the wire 71, for instance, a wire 73 extends to the burner motor 25. From the burner motor 25, a wire 74 extends to one pole of the switch 63. From the other pole of the switch 63, a wire 75 extends to one pole of the switch 70. From the other pole of the switch 70, wires 76a and 76 extend to one pole of the limit control switch 27. From the other pole of the limit control switch 27, wires 76a and 77 connect to the room thermostat 78, which is in turn connected by the wire 78a with the current supply wire 72.

Leading from the wire 73 is a branch wire 79 extending to the fan motor 23. Another wire 80 runs from the fan motor to the fan control switch 26. The fan control switch is connected by wires 81 and 82 with the wire 77.

Thus it will be seen that if the thermostat 78 in the room 18 calls for heat, a circuit will be closed through the limit control, and through motor 56, wire 97, wire 79, wire 73 to line wire 71. The resulting operation of the motor 56 closes switches 70 and 63 permitting current to flow from wire 76, through wire 76a, switch 70, wire 75, switch 63, wire 74, motor 25 and wire 73 to line wire 71 and the motor 25 will operate.

So likewise whenever heat in the bonnet 13 is sufficient to close the fan control switch 26, a circuit will be closed through the room thermostat 78 and the wire 77 and wires 82 and 81 and through the fan control switch 26 and the fan motor, so that the fan motor will be operated.

In the duct 14 is a manually operated damper 83, by which the flow of heating medium to the room 18 may be controlled.

Further reference will be made to this damper.

It will be observed that each of the rooms 19, 20 and 21 have room thermostats 84, 85 and 86. These are connected with the current supply wire 71 by part of wire 73 and by wires 84a, 88 and 89. They are also connected with the motors and switches of the duct dampers A in the respective ducts 15, 16 and 17 by wires 90, 91 and 92.

I shall first describe the thermostat circuit of each duct damper control, and then the switch circuit of each duct damper control.

The motor of the duct damper control A in the duct 15 is connected with the wire 72 by a wire 93 and part of wire 94. Thus when the thermostat 84 calls for heat, a circuit will be completed from the wire 72, through the wire 93, part of wire 94, the motor 46 of the duct damper control A in the duct 15, the wire 90, the thermostat 84, the wire 84a, and a portion of the wire 73 and wire 71.

The motors 46 of the damper controls in the ducts 16 and 17 are similarly connected in circuits with the respective thermostats 85 and 86.

When the motor 46 of a damper control A is energized, it closes its corresponding switch 51. The switch 51 of the duct damper control A in the duct 15 is connected by the wire 93 and the wire 94 with the wire 72 and is connected by a wire 95 with the wire 77, and thence by the wire 76a with the limit control switch 27, and thence by the wires 76 and 75a with the switch 70. The other pole of the switch 70 is connected by the wire 75 with one pole of the switch 63. The other pole of the switch 63 is connected by the wire 74 to the burner motor 25, which in turn is connected by the wire 73 with the current supply wire 71. The switches 51 of the duct damper controls A in the ducts 16 and 17 are similarly connected in circuits with the limit control, the stack damper switches, and the burner motor.

It will be observed there is also a connection of the wire 77 with the wires 82 and 81, the fan control switch 26 and the wire 80 with the fan motor 23 and wires 79 and 73 and wire 71.

It will be understood that the switches of the other duct damper controls are similarly connected in circuit with the fan motor.

The stack switch motor 56 is connected by a wire 96 with the wire 76 and by a wire 97 with the wire 79.

*Operation of duct dampers and controls*

Assuming that the system is being started cold, and that the room thermostat 84 calls for heat, a circuit will be closed through the motor 46 as already explained. The energizing of the motor 46 opens its corresponding damper and closes the switch 51. The circuit is then closed through the wire 93, the wire 94, switch 51, the wire 95, a portion of the wire 77, the wire 76a, the limit control switch 27, the wire 76, the stack damper control motor 56, the wire 97, the wire 79, and the wire 73 to the wire 71.

The motor 56 is thereby energized and functions to open its stack damper, and to simultaneously close the switches 63 and 70.

Thereupon a circuit will be closed from the wire 76 through the wire 75a, switch 70, wire 75, switch 63, wire 74, burner motor 25 and wire 73 and wire 71 for operating the burner motor.

After the burner has operated long enough to raise the temperature in the bonnet 13 sufficiently to close the fan switch 26, then a circuit is completed, from the wire 77, through part of the wire 82 and wire 81, fan control switch 26, wire 80, fan motor 23 and wires 79, 73 and 71.

Thereupon the fan is operated to drive the air through the duct 15 to the room 19, in which the thermostat 84 is located.

The operation of the duct damper controls for the rooms 20 and 21 is similar.

If the burner generates heat faster than the blower can carry it away through the duct 15, the temperature in the bonnet 13 rises, causing the limit control switch 27 to open the circuit through the stack damper motor 56, which closes the smoke pipe damper and simultaneously opens the switches 63 and 70, opening the circuit to the burner motor, causing the burner to shut down, until such time as the heat in the bonnet has been reduced sufficiently to again cause the closing of the limit control switch 27.

When the burner is thus shut down by the opening of the limit control switch, residual heat in the bonnet continues to be supplied to the room 19, the thermostat of which is calling for heat. It may be that this residual heat will be sufficient to satisfy the thermostat, whereupon the thermostat will break the circuit through the duct control motor 46 in the duct 15, and the corresponding damper 29 will be closed, and the switch 51 opened, which will result in the shutting down of the blower, and any unused heat will be locked in the bonnet, except as mentioned later.

In case, the residual heat is not sufficient to satisfy the thermostat, the limit control will be closed for starting the burner again.

If some other thermostat in the system calls for heat while the bonnet temperature is so high that the limit control switch is open, this calling for heat by the thermostat will result only in the opening of the damper in the duct, leading to that room, and in the operation of the blower to utilize first of all the residual heat, which may or may not satisfy the thermostat. If it is not sufficient, the limit control will start the burner as mentioned above.

Attention is called to the fact that during the period when the burner is idle, where the blower is operating or standing by, the stack damper remains closed, conserving the residual heat in the system.

One characteristic of this circuit that should be noted is that should the switches 63 and 70 fail to open, the burner will be stopped by the opening of the limit control switch 27 as in the conventional oil burner or gas burner installation.

Thus the introduction into the system of the stack damper does not introduce any hazard of overheating the system.

I have provided the usual automatic draft adjuster 100, and have located it in the smoke pipe 11 between the combustion chamber and the stack damper 54. By this arrangement, I get the full benefit of the automatic draft control when the stack damper is open, but when the stack damper is closed, the automatic draft adjuster will not admit air to the smoke pipe 11 and this arrangement contributes to conserving the residual heat in the system for use where and when called for.

Furthermore by this arrangement of the automatic draft adjuster, I very greatly reduce the chilling of the chimney by the cold air that would otherwise be drawn through the automatic draft control.

Thus by this arrangement, the flow of cold air through the draft adjuster and up the chimney is avoided during stand-by periods, and the chimney is kept warm for affording a proper draft for a start after a long stand-by period, and there is also provided a greater percentage of the operating draft over short stand-by periods.

This retention of heat permits the radiating of a greater portion of the retained heat to the building in the case of an inside chimney.

By keeping the draft adjuster closed during stand-by periods and avoiding the flow of air from the basement through the chimney, I reduce the infiltration into the building of cold air.

The damper 83 in the duct 14 leading to the room 18 which may be the bathroom, can be adjusted according to choice and if it is left in position to allow flow of air through the duct 14, then warm air will be delivered to the room 18 in response to the call for heat of any thermostat in the system.

This arrangement can be used in connection with any room to which it is desired to have a constant delivery of heat.

It is often desirable to increase the temperature of the bathroom at a time when the temperature in a bedroom is being raised. Thus the setting up to a higher control point of a thermostat in the bedroom will result in raising of the temperature in the bathroom.

With this arrangement, heat will continue to be delivered to the bathroom throughout the night, even though the bedrooms receive no heat during this period, the bathroom receiving heat in proportion to the demands of the rest of the house, exclusive of the bedrooms and receiving additional heat at the time when the bedrooms are being warmed in the morning.

But through the use of the thermostat 78, the bathroom temperature can be raised above the point at which it normally stands without affecting any other portion of the house. The bathroom alone may be heated in weather when no heat is needed in any other part of the house.

It will be appreciated that the arrangement shown here for the room 18 may be used for more than one room. This may be of particular importance where stokers or other heating mechanisms, incapable of such accurate control as oil or gas burners are employed, and where it is desirable to have what might be called a dump room for surplus heat.

In this connection, any of the dampers may be set to leak, through the adjustment of the stop 42 shown in Figures 2 to 4. The dampers may be set to leak where it is desired to merely reduce the delivery of heat to the room rather than to stop it entirely.

My system adapts itself to the use of a clock thermostat in a room, such as a living room, for controlling temperature therein, while maintaining uniform temperature in a bathroom by proper setting of the thermostat 78.

Also for example, with this system, it is possible to set the bathroom for a minimum temperature of 75° and to set a clock thermostat in a living or dining room to give 60° at night and 70° in the daytime. Then in the morning when the room thermostat calls for 70°, some heat will also be furnished to the bathroom, giving an overrun of temperature in the bathroom at the time when it is desirable.

After the rest of the house is heated up, the heat in the bathroom will be dissipated and the temperature of the bathroom will drop back toward its thermostat setting.

In the system herein described, it will be seen that I have accomplished the objects hereinbefore set forth, and have provided a control apparatus having many other important advantages.

Various rooms can be heated independently of each other according to their respective needs.

My system can be applied to any warm air heating system. It is a zone control system carried into residence heating, and to a point beyond that ordinarily reached in the heating of large spaces.

One room or more rooms for instance the bathroom or hall or both may be provided with heat, whenever heat is supplied to any part of the building.

It will be obvious that this could be done without the use of a thermostat in the bathroom, merely through the adjustment of the damper in the bathroom duct.

In Figure 9, I have shown a slightly modified arrangement of my system in which one thermostat 84a is arranged in circuit with damper motors 46a, 46b in a plurality of ducts. One damper 46b is associated with a duct damper switch 51a in the same manner that the damper 46 of Figure 1 is associated with the duct damper switch 51. The switch 51a is connected with the other operating parts of the system in the same manner as is the switch 51.

Thus with the arrangement shown in Figure 9, a single thermostat can be used to control a plurality of duct dampers for controlling flow through a plurality of ducts leading to one large room or to a plurality of rooms or to large room spaces thrown together with wide door openings. In this arrangement only one switch is needed for the several dampers controlled by the single thermostat.

In my system, the blower runs whenever it should run, and never when it should not, and likewise the burner runs whenever it should, and never when it should not.

My system has a flexibility and economy not possible with a one thermostat installation. This economy is partially due to the fact that in bringing any one room to temperature, there is no overheating of the rest of the house.

The temperature carried in the different rooms can be varied at will without affecting the temperature in other parts of the house.

My system eliminates the unbalancing of the heating system that frequently results where other systems are used, due to shifting or rising of winds or variation in sun effect or other changes in the weather.

My system eliminates the necessity for using extreme care in the sizing of ducts in a trunk line system. It is possible with this system to use smaller blowers than would otherwise be necessary, and also smaller heating plants, and smaller burners, because in only rare instances are all the ducts open at the same time, and even when they are, it is only a short time until some thermostats begin to close their dampers, and the heat no longer needed for the room in which the thermostat circuit is open is available to help bring other rooms up to temperature.

This system makes it possible to raise bedrooms from night temperature to day temperature in minutes where it formerly has taken hours.

By the particular arrangement of the stack damper and the automatic damper control, I am able to preserve and use residual heat and to conserve heat in the chimney with the advantages hereinbefore mentioned.

It is entirely practical to shut off the heat from unoccupied spaces until shortly before the space is to be occupied.

If the house is to be empty during the day, it is often convenient to shut off the heat in all but one or two bedrooms and the bathroom.

In duplex homes, this system makes it possible to control each apartment separately, and thus eliminate a problem that has always existed in such buildings, that of giving each tenant the heat he desires when he desires it.

By putting a thermostat in each apartment, the temperature selection is in each tenant's hands. As it eliminates overheating, it results in a very great fuel saving in apartment house heating.

No current is consumed unless the thermostat is calling for heat.

By substituting for the thermostats shown, so-called summer-winter thermostats (heating-cooling thermostats) it is possible to utilize the same ducts, dampers, blowers, filters and so forth throughout the year. The summer-winter thermostat is one that will close the circuit either on a fall in temperature for use in the heating cycle in winter, or a rise in temperature for use in the cooling cycle in the summer.

The selection of the way the thermostat functions is made by the positioning of the summer-winter switch built into the thermostat. Such thermostats are commercially available from various sources including the Penn Electric Switch Co. of Des Moines, Iowa, and Julian P. Friez & Sons, Incorporated of Baltimore, Maryland.

When this system is used, it is often unnecessary to install cooling equipment with sufficient capacity to care for the entire house. Instead a cooling plant of sufficient capacity to cool a living room and dining room is often sufficient, as during the day the cool air can be directed to the living room and dining room, and at night, these dampers may be closed and the cool air directed to bedrooms.

In the cooling system, the fan control can be shunted out and the blower made available any time the thermostat causes the damper to open. The burner is shut down for the cooling cycle. This can be done automatically or through the operation of a manual switch.

There are times when outside air is ideal for use inside without the necessity for operating the furnace or inside temperature changing device. I have devised controls and equipment and worked out circuits whereby the outside air can be used at such times, with this system, and whereby when the use of outside air is no longer desirable, its use is automatically discontinued, and the heating or temperature changing equipment of the system is automatically put into operation.

Thus when cool outside air is available, it may be used for cooling the house or part of it, and a resulting comfort may be had at very small added expense, which does not involve the cost of cooling coils and condensing units.

This further illustrates the flexibility of my system and the great variety of arrangements available with it.

The switch which controls the burner in the winter can be used in the summer for controlling the condensing unit or pumps of a cooling system. Cooling units may be installed or outside air can be used to the extent that it is available, or both can be employed, and the controls will automatically select whichever ought to be used.

It is my purpose to cover by my claims any variations in the construction of the parts or in the arrangement thereof in combinations which may be included within the spirit of my invention, or the scope of my claims.

I claim:

1. In a heating system, with ducts for carrying air to different rooms, means for controlling the flow of air through the respective ducts according to temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch, and a fan control switch, means for including the limit control switch in circuit with each damper switch and the burner motor, and means for including the fan control switch and the fan motor in circuit with each damper switch.

2. In a heating system, with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch and a fan control switch, means for including the limit control switch in circuit with each damper switch and the burner motor, and means for including the fan control switch and fan motor in circuit with each damper switch, a stack damper, a motor to operate the damper, a switch adapted to operate in conjunction with the stack damper, means for including the stack damper motor in circuit with the limit control and with each duct damper switch, and means for including the stack switch in circuit with the limit control switch and the burner motor, the limit control switch being so arranged in circuit with the burner motor that opening of the limit control switch will break the circuit through the burner motor, regardless of the positions of the dampers.

3. In a heating system with a combustion chamber and with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch and a fan control switch, means for including the limit control switch in circuit with each damper switch, and the burner motor, means for including the fan control switch and fan motor in circuit with each damper switch, a stack damper, a motor to operate the stack damper, a switch adapted to operate in conjunction with the stack damper, means for including the stack damper motor in circuit with the limit control and with each duct damper switch, and means for including the stack switch in circuit with the limit control switch and the burner motor, and an automatic draft adjuster, between the stack damper and the combustion chamber.

4. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch and a fan control switch, means for including the limit control switch in circuit with each damper switch and the burner motor, means for including the fan control switch and the fan motor in circuit with each damper switch, a duct for conveying air from the furnace to an additional room, and a manually adjustable means for controlling flow through said last-named duct.

5. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch and a fan control switch, means for including the limit control switch in circuit with each damper switch and the burner motor, means for including the fan control switch and the fan motor in circuit with each damper switch, a duct for conveying air from the furnace to an additional room, a manually adjustable means for controlling flow through said last-named duct, a stack damper, a motor to operate the damper, a switch adapted to be operated in conjunction with the stack damper, means for including the stack damper motor in circuit with the limit control switch and with each duct damper switch, and means for including the stack switch in circuit with the limit control switch and the burner motor.

6. In a heating system, the combination of a furnace, with ducts to conduct heating medium to different rooms, flow control elements in the respective ducts, means for controlling said elements and thus controlling flow through the respective ducts according to the temperatures resulting from the flow of heating medium through the ducts, a stack damper, and means for controlling the stack damper according to the condition of the elements and the condition of the furnace and for controlling the operation of the furnace according to the condition of the stack damper.

7. In a heating system, having a combustion chamber and having ducts to conduct heating medium to different rooms, flow control elements in the respective ducts, means for controlling said elements and thus controlling flow through the respective ducts according to the temperatures resulting from the flow of heating medium through the ducts, a stack damper, and means for controlling the stack damper according to the condition of the elements and the condition of the furnace and for controlling the operation of the furnace according to the condition of the stack damper, and an automatic draft adjuster between the stack damper and the combustion chamber.

8. In a heating system, a furnace, a stack damper, and means for controlling the stack damper according to the temperature of the place heated by the system and the condition of the furnace and for controlling the operation of the furnace according to the condition of the stack damper, and an automatic draft adjuster between the stack damper and the furnace.

9. In an air conditioning system, with a chamber in which air temperature is changed, ducts for conducting the conditioned air from the chamber to different rooms, means for controlling the flow of air through the ducts, regulated according to temperatures resulting from the flow of conditioned air through the ducts, said means comprising dampers in the ducts, motors to operate the dampers, thermostats in circuit with the respective motors, switches adapted to be actuated in conjunction with the respective dampers, a fan for causing air flow through the ducts, a motor for operating the fan, a fan control switch, means for including the fan control switch in circuit with each damper switch and the fan motor, means for effecting temperature changes in the chamber, including an electrically operated member, and means for including each damper switch in circuit with said member.

10. In an air conditioning system with a chamber in which air temperature is changed, ducts for conducting the conditioned air from the chamber to different rooms, means for controlling the flow of air through the ducts, regulated according to temperatures resulting from the flow of conditioned air through the ducts, said means comprising dampers in the ducts, motors to operate the dampers, thermostats in circuit with the respective motors, switches adapted to be actuated in conjunction with the respective dampers, a fan for causing air flow through the ducts, a motor for operating the fan, a limit control, a fan control switch, means for including the fan control switch in circuit with each damper switch and the fan motor, means for effecting temperature changes in the chamber, including an electrically operated member, and means for including each damper switch in circuit with said member and with the limit control switch.

11. In a heating system, the combination of a furnace having a vent duct and a chamber for heated medium, a series of ducts for conveying medium to different rooms from the chamber and a burner, with a means for forcing flow of heating medium, devices for controlling flow through the respective ducts, according to the temperatures resulting from flow of medium through the ducts, a stack damper in the vent duct, means for operating said first means only, for forcing heating medium from the chamber when any of said devices calls for heat, and there is a predetermined temperature in the chamber, and means for opening the stack damper and operating the burner when any such device calls for heat and the heat of the chamber is below the predetermined temperature.

12. In a heating system, the combination of a furnace having a vent duct and a chamber for heating medium, a series of ducts for conveying medium to different rooms from the chamber and a burner, with means for forcing flow of heating medium, devices for controlling flow through the respective ducts according to the temperatures resulting from flow of medium through the ducts, a stack damper in the vent duct, means for operating said first means only, for forcing heating medium from the chamber when any of said devices calls for heat, and there is a predetermined temperature in the chamber, means for opening the stack damper and operating the burner when any such device calls for heat and the heat of the chamber is below the predetermined temperature, and an automatic draft control in the vent duct between the stack damper and the combustion chamber of the furnace.

13. In a heating system with ducts for carrying air, means for controlling the flow of air through the ducts according to temperature resulting from the flow of air through the ducts, said means comprising dampers in the respective ducts, motors to operate the dampers, a thermostat arranged in circuit with the respective damper motors, a switch adapted to be actuated in conjunction with one of the dampers, a burner motor, a fan motor, a limit control switch and a fan control switch, means for including the limit control switch in circuit with the damper switch and the burner motor, and means for including the fan control switch and the fan motor in circuit with the damper switch.

14. In a heating system with ducts for carrying air, means for controlling the flow of air through the ducts according to temperature resulting from the flow of air through the ducts, said means comprising dampers in the respective ducts, motors to operate the dampers, a thermostat arranged in circuit with the respective damper motors, a switch adapted to be actuated in conjunction with one of the dampers, a burner motor, a fan motor, a limit control switch and a fan control switch, means for including the limit control switch in circuit with the damper switch and the burner motor, and means for including the fan control switch and the fan motor in circuit with the damper switch, a stack damper, a motor to operate the stack damper, a switch adapted to operate in conjunction with the stack damper, means for including the stack damper motor in circuit with the limit control switch and with the duct damper switch, and means for including the stack damper switch in circuit with the limit control switch and the burner motor.

15. In a heating system with a combustion chamber and with ducts for carrying air, means for controlling the flow of air through the ducts according to temperature resulting from the flow of air through the ducts, said means comprising dampers in the respective ducts, motors to operate the dampers, a thermostat arranged in circuit with the respective damper motors, a switch adapted to be actuated in conjunction with one of the dampers, a burner motor, a fan motor, a limit control switch, and a fan control switch, means for including the limit control switch in circuit with the damper switch and the burner motor, and means for including the fan control switch and the fan motor in circuit with the damper switch, a stack damper, a motor to operate the stack damper, a switch adapted to operate in conjunction with the stack damper, means for including the stack damper motor in circuit with the limit control and with the duct damper switch, and means for including the stack damper switch in circuit with the limit control switch and the burner motor, and an automatic draft adjuster between the stack damper and the combustion chamber.

16. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch, and a fan control switch, means for including the limit control switch in circuit with each damper switch and the burner motor, means for including the fan control switch and fan motor in circuit with each damper switch, a duct conveying air from the furnace to an additional room, a manually adjustable means for controlling the flow through said last-named duct, and a room thermostat adapted to be placed in such additional room, and means for including said last-named thermostat in circuit with the limit control and the burner motor and the fan control and fan motor.

17. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch and a fan control switch, means for including the limit control switch in circuit with each damper switch and the burner motor, means for including the fan control switch and the fan motor in circuit with each damper switch, a duct for conveying air from the furnace to an additional room, a manually adjustable means for controlling flow through said last-named duct, a stack damper, a motor to operate the stack damper, a switch adapted to be operated in conjunction with the stack damper, means for including the stack damper motor in circuit with the limit control switch and with each duct damper switch, means for including the stack switch in circuit with the limit control switch and the burner motor, and an automatic draft adjuster between the stack damper and the furnace.

18. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch, and a fan control switch, means for including the limit control switch in circuit with each damper switch and the burner motor, means for including the fan control switch and fan motor in circuit with each damper switch, a duct for conveying air from the furnace to an additional room, a manually adjustable means for controlling the flow through said last-named duct, a room thermostat adapted to be placed in such additional room, means for including said last-named thermostat in circuit with the limit control and the burner motor and the fan control and fan motor, a stack damper, a motor to operate the stack damper, a switch adapted to be operated in conjunction with the stack damper, means for including the stack damper motor in circuit with the limit control switch and with each duct damper switch, and means for including the stack switch in circuit with the limit control switch and the burner motor.

19. In a heating system, the combination of a furnace with ducts for carrying air to different rooms, means for controlling the flow of air through the respective ducts according to the temperatures resulting from the flow of air through the ducts, said means comprising dampers in the respective ducts, motors to operate the dampers, thermostats arranged in circuit with the respective damper motors, switches adapted to be actuated in conjunction with the dampers, a burner motor, a fan motor, a limit control switch, and a fan control switch, means for including the limit control switch in circuit with each damper switch and the burner motor, means for including the fan control switch and fan motor in circuit with each damper switch, a duct for conveying air from the furnace to an additional room, a manually adjustable means for controlling the flow through said last-named duct, a room thermostat adapted to be placed in such additional room, means for including said last-named thermostat in circuit with the limit control and the burner motor and the fan control and fan motor, a stack damper, a motor to operate the stack damper, a switch adapted to be operated in conjunction with the stack damper, means for including the stack damper motor in circuit with the limit control switch and with each duct damper switch, means for including the stack switch in circuit with the limit control switch and the burner motor, and an automatic draft adjuster between the stack damper and the combustion chamber.

WILLIAM W. STUART.